United States Patent
Jackson et al.

[11] Patent Number: 6,068,285
[45] Date of Patent: May 30, 2000

[54] STROLLER ATTACHABLE MOBILE SUPPORT

[76] Inventors: Vera L. Jackson; Russell Jackson, both of 20061 NW. 43 Ct., Carol City, Fla. 33055

[21] Appl. No.: 09/055,792

[22] Filed: Apr. 6, 1998

[51] Int. Cl.[7] ...................................................... B62B 1/00
[52] U.S. Cl. .................. 280/650; 280/47.41; 297/217.3; 446/227
[58] Field of Search .............................. 280/47.19, 47.35, 280/47.41, 649, 650; 180/166; 446/3, 227, 229

[56] References Cited

U.S. PATENT DOCUMENTS

| | | | |
|---|---|---|---|
| 3,919,795 | 11/1975 | Van Horne Jinivisian et al. | 40/33 |
| 4,188,745 | 2/1980 | Harvey et al. | 46/32 |
| 4,540,219 | 9/1985 | Klinger | 297/487 |
| 4,640,034 | 2/1987 | Zisholtz | 40/455 |
| 4,904,220 | 2/1990 | Williams et al. | 446/227 |
| 4,984,370 | 1/1991 | Anderson | 40/455 |
| 5,348,370 | 9/1994 | Fukuoka | 297/217 |
| 5,352,145 | 10/1994 | Raiffe et al. | 446/227 |
| 5,370,570 | 12/1994 | Harris | 446/227 |
| 5,490,713 | 2/1996 | Fukuoka | 297/217.3 |
| 5,516,192 | 5/1996 | Fukuoka | 297/217.3 |
| 5,542,741 | 8/1996 | Fukuoka | 297/217.3 |
| 5,556,161 | 9/1996 | Fukuoka | 297/217.3 |
| 5,672,088 | 9/1997 | Chininis | 446/227 |
| 5,803,786 | 9/1998 | McCormick | 446/227 |

*Primary Examiner*—Christopher P. Ellis
*Assistant Examiner*—Rashmi Sharma
*Attorney, Agent, or Firm*—Joseph N. Breaux

[57] ABSTRACT

A stroller attachable mobile support that includes a forward U-shaped mobile support, a rear U-shaped mobile support, and two stroller frame attachment mechanisms. Each of the forward and rear U-shaped mobile supports includes a horizontal mobile attachment portion having a number of mobile element attachment rings. The forward U-shaped mobile support includes one of the two stroller frame attachment mechanisms formed at the end of each of two parallel portions thereof. The rear U-shaped mobile support portion extends away from the two parallel portions of the forward U-shaped mobile support. Each of the stroller frame attachment mechanisms is a mirror image of the other and includes a stroller frame structure member receiving channel and a threaded mobile support securing screw. The forward U-shaped mobile support includes a battery compartment, a two-position on/off switch, and a vibration mechanism. The two-position on/off switch is wired in controlling connection with the vibration mechanism. The vibration mechanism is installed within the horizontal mobile attachment portion of the forward U-shaped mobile support. The vibration mechanism includes an electric motor and an off center vibration mass, the vibration mass being secured to the output shaft of the electric motor.

11 Claims, 4 Drawing Sheets

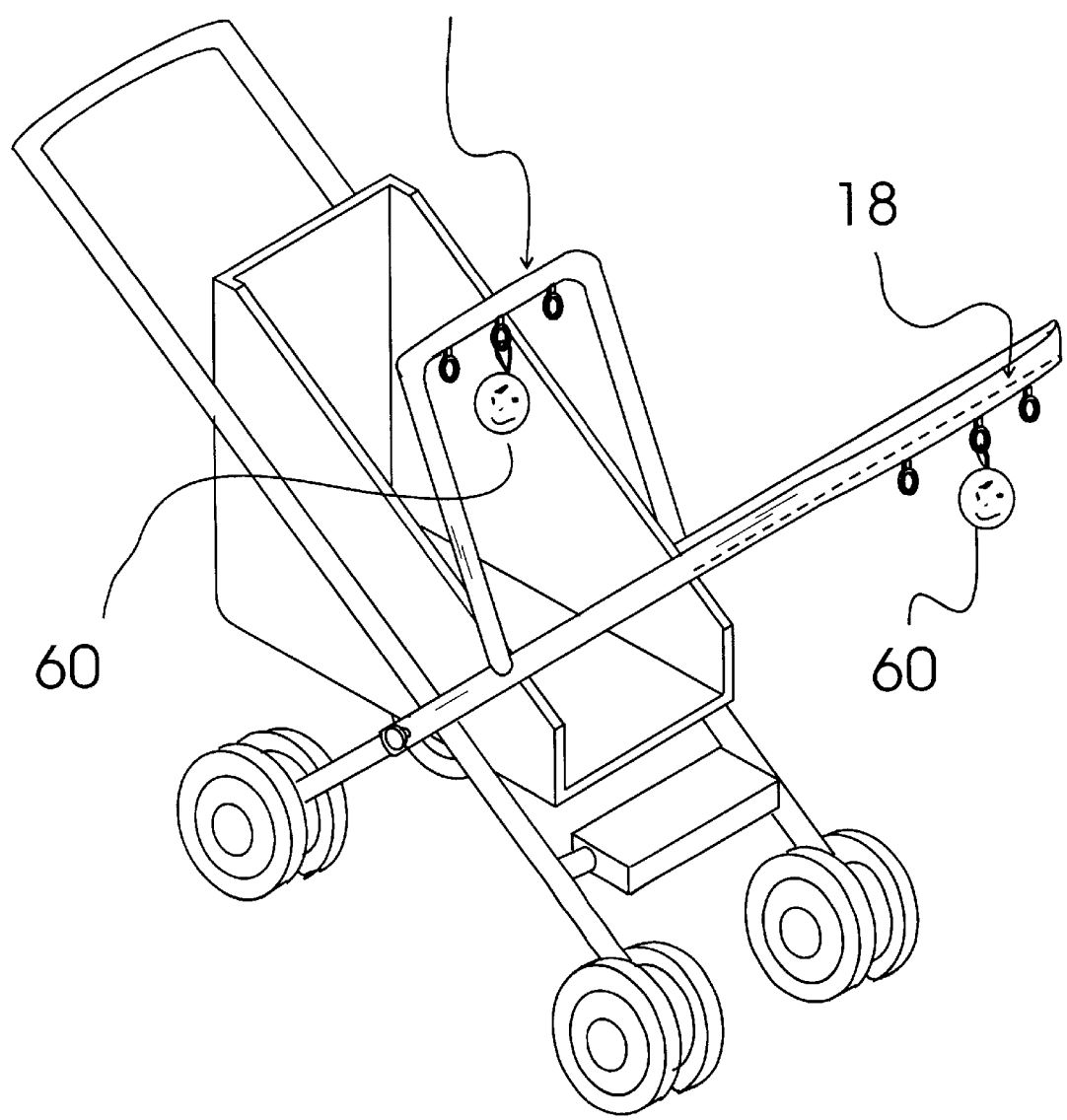

STROLLER ATTACHABLE MOBILE SUPPORT

TECHNICAL FIELD

The present invention relates to a mobile support that is attachable to a stroller frame having left and right mirror image stroller frame subassembly wherein each of the right and left stroller frames includes a frame structural member having a threaded mobile attachment aperture formed thereinto; the stroller attachable mobile support including a forward U-shaped mobile support, a rear U-shaped mobile support, and two stroller frame attachment mechanisms; each of the forward and rear U-shaped mobile supports including a horizontal mobile attachment portion having a number of mobile element attachment rings; the forward U-shaped mobile support including one of the two stroller frame attachment mechanisms formed at the end of each of two parallel portions thereof; the rear U-shaped mobile support portion extending away from the two parallel portions of the forward U-shaped mobile support; each of the stroller frame attachment mechanisms being a mirror image of the other and including a stroller frame structure member receiving channel and a threaded mobile support securing screw; the forward U-shaped mobile support including a battery compartment, a two-position on/off switch, and a vibration mechanism; the two-position on/off switch being wired in controlling connection with the vibration mechanism; the vibration mechanism being installed within the horizontal mobile attachment portion of the forward U-shaped mobile support; the vibration mechanism including an electric motor and an off center vibration mass, the vibration mass being secured to the output shaft of the electric motor.

BACKGROUND ART

It is often difficult to keep stroller bound children amused for extended periods of times. Because it would be desirable to provide amusing and interest generating elements within the reach and field of view of a stroller bound child, it would be a benefit to have a mobile support that was attachable to the frame of a stroller that included a number of rings from which amusing and interest generating mobile elements could be suspended. Because mobile elements are typically more interesting when moving, it would be a further benefit to have a mobile support that included a motion generating mechanism for imparting motion to mobile elements suspended therefrom.

GENERAL SUMMARY DISCUSSION OF INVENTION

It is thus an object of the invention to provide a stroller attachable mobile support.

It is a further object of the invention to provide a stroller attachable mobile support that is constructable using plastic plumbing pipe and fittings.

It is a still further object of the invention to provide a stroller attachable mobile support that includes a number of rings from which amusing and interest generating mobile elements are suspendable.

It is a still further object of the invention to provide a stroller attachable mobile support that includes a motion generating mechanism for imparting motion to mobile elements suspended therefrom.

It is a still further object of the invention to provide a stroller attachable mobile support that includes a forward U-shaped mobile support, a rear U-shaped mobile support, and two stroller frame attachment mechanisms; each of the forward and rear U-shaped mobile supports including a horizontal mobile attachment portion having a number of mobile element attachment rings; the forward U-shaped mobile support including one of the two stroller frame attachment mechanisms formed at the end of each of two parallel portions thereof; the rear U-shaped mobile support portion extending away from the two parallel portions of the forward U-shaped mobile support; each of the stroller frame attachment mechanisms being a mirror image of the other and including a stroller frame structure member receiving channel and a threaded mobile support securing screw; the forward U-shaped mobile support including a battery compartment, a two-position on/off switch, and a vibration mechanism; the two-position on/off switch being wired in controlling connection with the vibration mechanism; the vibration mechanism being installed within the horizontal mobile attachment portion of the forward U-shaped mobile support; the vibration mechanism including an electric motor and an off center vibration mass, the vibration mass being secured to the output shaft of the electric motor.

It is a still further object of the invention to provide a stroller attachable mobile support that accomplishes some or all of the above objects in combination Accordingly, a stroller attachable mobile support is provided. The stroller attachable mobile support includes a forward U-shaped mobile support, a rear U-shaped mobile support, and two stroller frame attachment mechanisms; each of the forward and rear U-shaped mobile supports including a horizontal mobile attachment portion having a number of mobile element attachment rings; the forward U-shaped mobile support including one of the two stroller frame attachment mechanisms formed at the end of each of two parallel portions thereof; the rear U-shaped mobile support portion extending away from the two parallel portions of the forward U-shaped mobile support; each of the stroller frame attachment mechanisms being a mirror image of the other and including a stroller frame structure member receiving channel and a threaded mobile support securing screw; the forward U-shaped mobile support including a battery compartment, a two-position on/off switch, and a vibration mechanism; the two-position on/off switch being wired in controlling connection with the vibration mechanism; the vibration mechanism being installed within the horizontal mobile attachment portion of the forward U-shaped mobile support; the vibration mechanism including an electric motor and an off center vibration mass, the vibration mass being secured to the output shaft of the electric motor. The forward and rear U-shaped mobile supports are preferably constructed from plastic pipe and plastic pipe fittings.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 6 is a perspective view showing the exemplary stroller attachable mobile support of FIG. 2 installed in connection with the representative stroller of FIG. 1.

EXEMPLARY MODE FOR CARRYING OUT THE INVENTION

Figure 1:
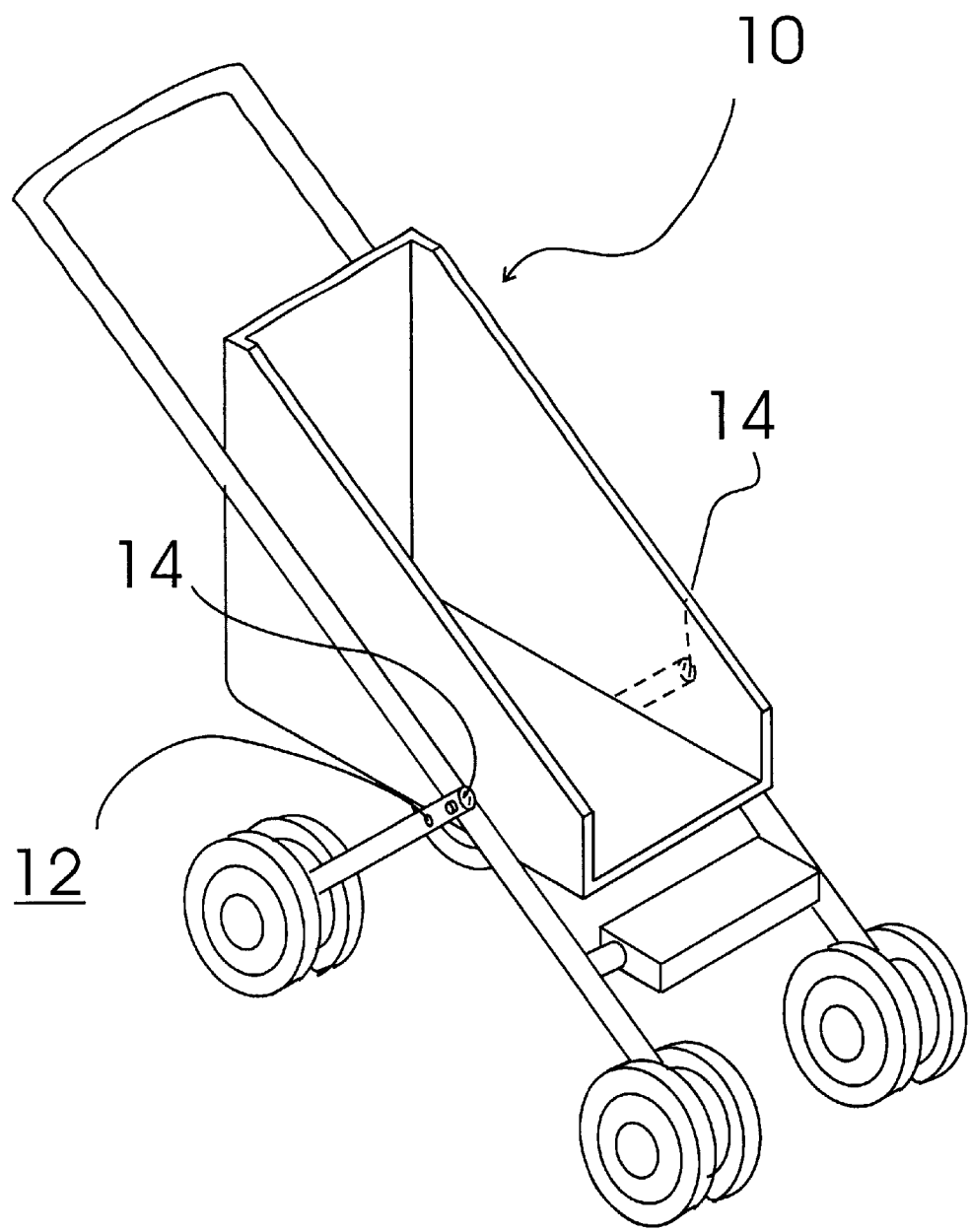
FIG. 1 is a perspective view of a representative stroller of the type with which the stroller attachable mobile support of the present invention is used showing the right side stroller frame subassembly with the threaded right side mobile attachment aperture formed into one of the right side stroller frame structural members, the left side stroller frame subassembly being a mirror image of the right side stroller frame.

FIG. 1 is a perspective view of a representative stroller, generally designated 10. Stroller 10 is of the type with which the stroller attachable mobile support of the present invention is used. Stroller 10 includes left and right frame subassemblies that are mirror images of each other and that each include a threaded mobile support attachment aperture 12 (only one shown) formed into a stroller frame structural member 14 thereof.

Figure 2:
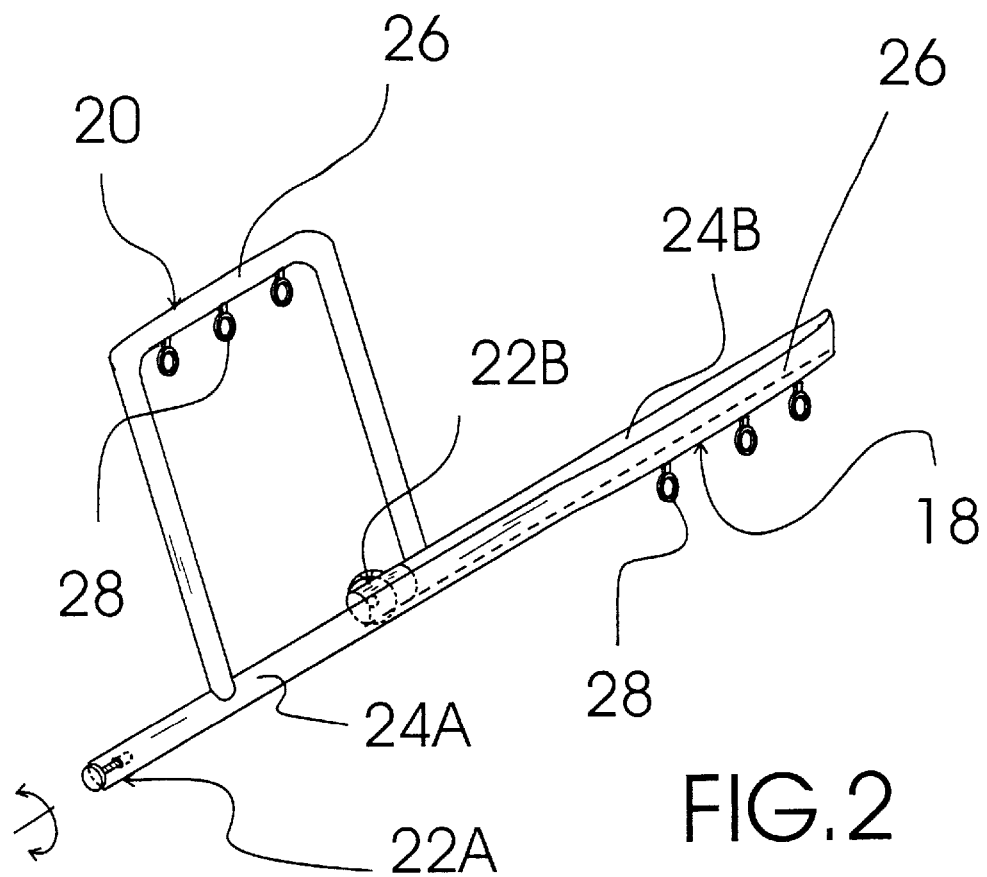
FIG. 2 is a perspective view of an exemplary embodiment of the stroller attachable mobile support of the present invention showing the forward and rear U-shaped mobile supports each including a horizontal mobile attachment portion having a number of mobile element attachment rings, the forward U-shaped mobile support including a stroller frame attachment mechanism at the end of each of the two parallel portions thereof, the rear U-shaped mobile support portion extending away from the two parallel portions of the forward U-shaped mobile support, the forward U-shaped mobile support including a battery compartment, a two-position on/off switch, and a vibration mechanism.

FIG. 2 shows an exemplary embodiment of the stroller attachable mobile support of the present invention, generally designated by the numeral 16. Mobile support 16 includes a forward U-shaped mobile support, generally designated 18; a rear U-shaped mobile support, generally designated 20; and two stroller frame attachment mechanisms, generally designated 22a,22b. Forward and rear U-shaped mobile supports 18,20 are of plastic pipe construction and are secured together with conventional plastic PVC pipe fittings such that rear U-shaped mobile support 20 extends away from the two parallel portions 24a,24b of forward U-shaped mobile support 18. Forward and rear U-shaped mobile supports 18,20 each include a horizontal mobile attachment portion 26 that includes a number of mobile element attachment rings 28 for attaching conventional mobile elements.

Figure 3:
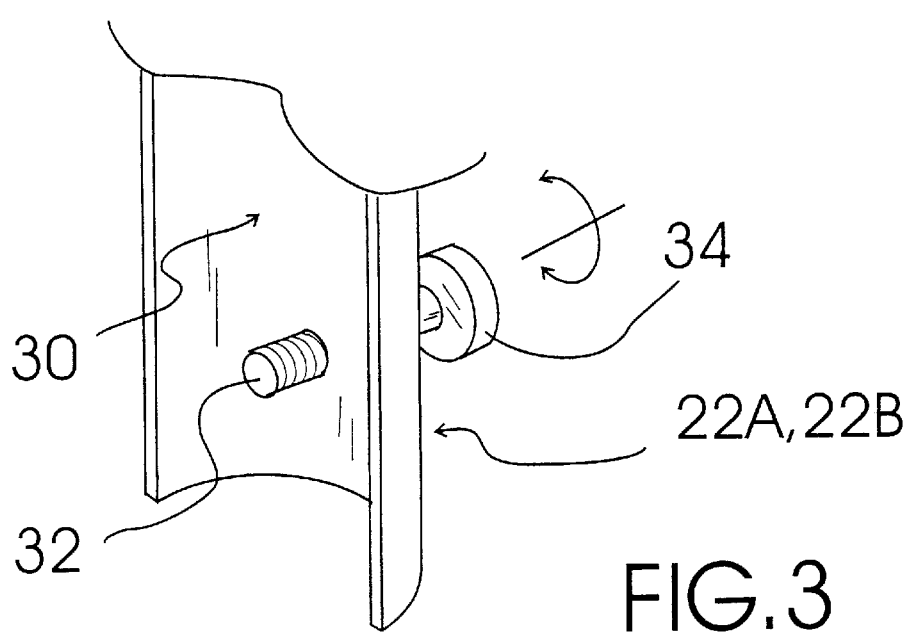
FIG. 3 is a partial cutaway perspective view of one of the mirror image stroller frame attachment mechanisms showing the stroller frame structure member receiving channel and the threaded mobile support securing screw.

With reference to FIG. 3, each stroller frame attachment 22a,22b is attached to the end of each of the two parallel portions 24a,24b, respectively, and includes a stroller frame structure member receiving channel 30 and a threaded mobile support securing screw 32. Mobile support securing screw 32 is provided with a knob 34 for easy tightening without tools. Mobile support securing screw 32 is threaded to engage the threaded mobile support attachment apertures 12 (FIG. 1) formed into stroller frame structural members 14 (FIG. 1).

Figure 4:
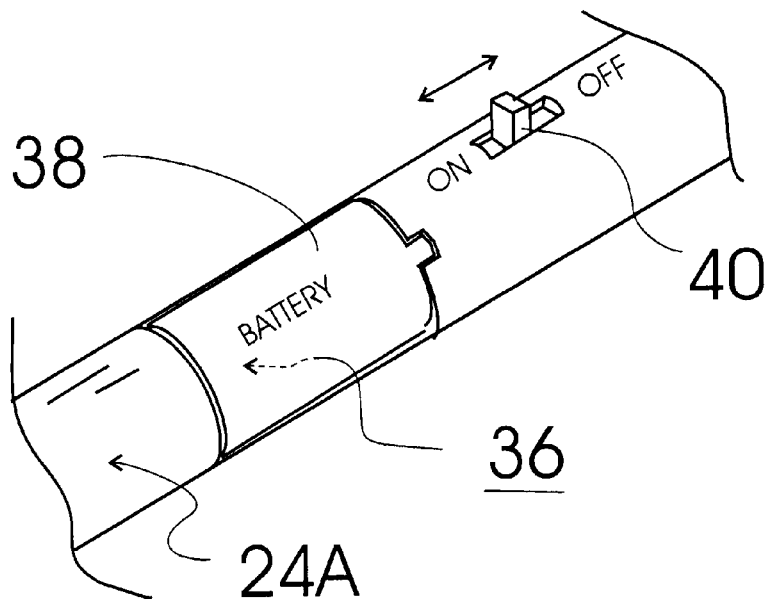
FIG. 4 is a partial perspective view of a section of one of the two parallel portions of the forward U-shaped mobile support showing the removable battery compartment door secured over the battery compartment access opening and the two-position on/off switch for controlling the vibration mechanism.
Figure 5:
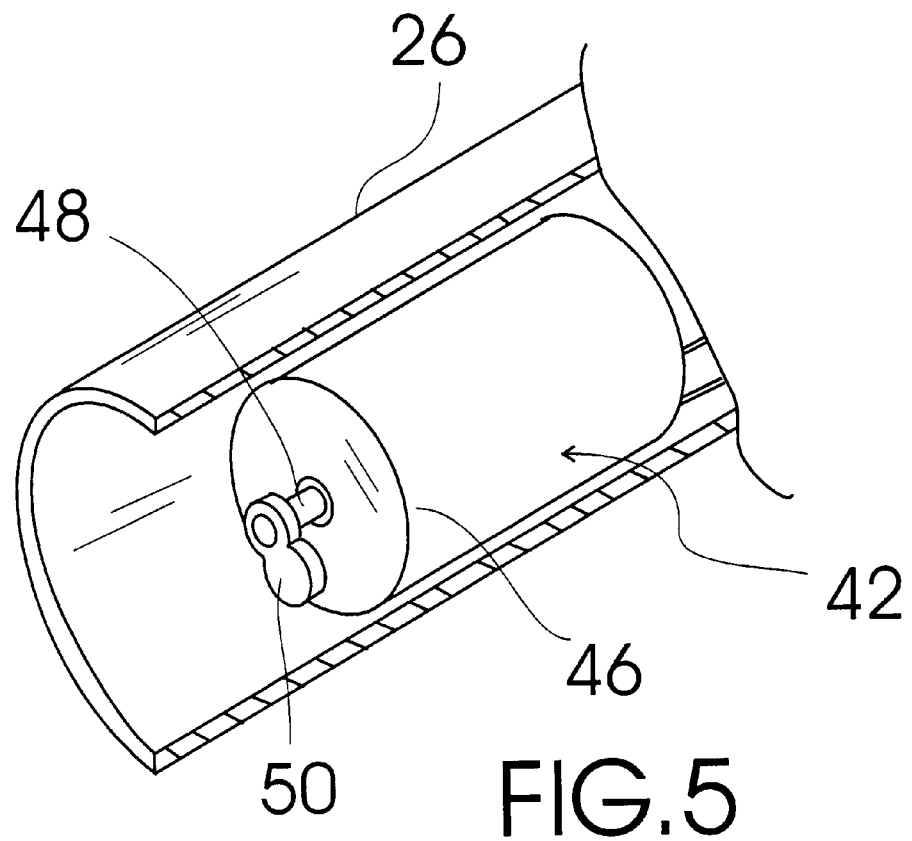
FIG. 5 is a partial cutaway perspective view of a section of the horizontal mobile attachment portion of the forward U-shaped mobile support showing the electric motor and the off center vibration mass secured to the output shaft of the electric motor.

Referring now to FIG. 4, parallel portion 24a of forward U-shaped mobile support 18 (FIG. 2) includes a battery compartment 36 that is accessible through a removable battery compartment cover 38; a two-position on/off switch 40, and a vibration mechanism 42 (FIG. 5). Two-position on/off switch 40 is wired in controlling connection between a battery connector positioned within battery compartment 36 and vibration mechanism 42 (FIG. 5).

Referring now to FIG. 5, vibration mechanism 42 is positioned within horizontal mobile attachment portion 26 (FIG. 2) of forward U-shaped mobile support 18 (FIG. 2). In this embodiment vibration mechanism 42 is an electric motor 46 having a rotary output shaft 48 upon which is mounted an off center vibration mass 50. As rotary output shaft 48 rotates, off center vibration mass 50 generates a vibrational force sufficient, referring now to FIG. 6, to vibrate forward and rear U-shaped mobile supports 18,20 and cause conventional mobile elements 60 suspended therefrom to move.

It can be seen from the preceding description that a stroller attachable mobile support has been provided that includes a number of rings from which amusing and interest generating mobile elements are suspendable; that includes a motion generating mechanism for imparting motion to mobile elements suspended therefrom; and that includes a forward U-shaped mobile support, a rear U-shaped mobile support, and two stroller frame attachment mechanisms; each of the forward and rear U-shaped mobile supports including a horizontal mobile attachment portion having a number of mobile element attachment rings; the forward U-shaped mobile support including one of the two stroller frame attachment mechanisms formed at the end of each of two parallel portions thereof; the rear U-shaped mobile support portion extending away from the two parallel portions of the forward U-shaped mobile support; each of the stroller frame attachment mechanisms being a mirror image of the other and including a stroller frame structure member receiving channel and a threaded mobile support securing screw; the forward U-shaped mobile support including a battery compartment, a two-position on/off switch, and a vibration mechanism; the two-position on/off switch being wired in controlling connection with the vibration mechanism; the vibration mechanism being installed within the horizontal mobile attachment portion of the forward U-shaped mobile support; the vibration mechanism including an electric motor and an off center vibration mass, the vibration mass being secured to the output shaft of the electric motor.

It is noted that the embodiment of the stroller attachable mobile support described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A stroller attachable mobile support comprising:
    a forward U-shaped mobile support;
    a rear U-shaped mobile support;
    two stroller frame attachment mechanisms; and
    a vibration mechanism attached such that vibratory movement is imparted to said forward and said rear U-shaped mobile support;

said forward and said rear U-shaped mobile support each including a horizontal mobile attachment portion having a number of mobile element attachment rings;

said forward U-shaped mobile support including one of said two stroller frame attachment mechanisms formed at an end of each of two parallel portions thereof;

said rear U-shaped mobile support portion being in connection with two parallel portions of said forward U-shaped mobile support;

each of said stroller frame attachment mechanisms being a mirror image of said other and including a stroller frame structure member receiving channel and a threaded mobile support securing screw.

2. The stroller attachable mobile support of claim 1, wherein:

said vibration mechanism is installed within said horizontal mobile attachment portion of said forward U-shaped mobile support.

3. The stroller attachable mobile support of claim 1 wherein:

said vibration mechanism includes an electric motor and an off center vibration mass, said vibration mass being secured to an output shaft of said electric motor.

4. The stroller attachable mobile support of claim 1 wherein:

said forward U-shaped mobile support includes a battery compartment, a two-position on/off switch, and said vibration mechanism;

said two-position on/off switch being wired in controlling connection with said vibration mechanism.

5. A stroller attachable mobile support comprising:

a forward U-shaped mobile support;

a rear U-shaped mobile support;

two stroller frame attachment mechanisms; and a vibration mechanism attached such that vibratory movement is imparted to said forward and said rear U-shaped mobile support;

said forward and said rear U-shaped mobile support each including a horizontal mobile attachment portion having a number of mobile element attachment rings;

said forward U-shaped mobile support including one of said two stroller frame attachment mechanisms formed at an end of each of two parallel portions thereof;

said rear U-shaped mobile support portion being in connection with two parallel portions of said forward U-shaped mobile support;

each of said stroller frame attachment mechanisms being a mirror image of said other and including a stroller frame structure member receiving channel and a threaded mobile support securing screw;

said forward and said rear U-shaped mobile supports being constructed with plastic tubing and a number of plastic tubing connecting fittings.

6. The stroller attachable mobile support of claim 5, wherein:

said vibration mechanism is installed within said horizontal mobile attachment portion of said forward U-shaped mobile support.

7. The stroller attachable mobile support of claim 5 wherein:

said vibration mechanism includes an electric motor and an off center vibration mass, said vibration mass being secured to said output shaft of said electric motor.

8. The stroller attachable mobile support of claim 5 wherein:

said forward U-shaped mobile support includes a battery compartment, a two-position on/off switch, and said vibration mechanism;

said two-position on/off switch being wired in controlling connection with said vibration mechanism.

9. The stroller attachable mobile support of claim 6 wherein:

said vibration mechanism includes an electric motor and an off center vibration mass, said vibration mass being secured to said output shaft of said electric motor.

10. The stroller attachable mobile support of claim 6 wherein:

said forward U-shaped mobile support includes a battery compartment, a two-position on/off switch, and said vibration mechanism;

said two-position on/off switch being wired in controlling connection with said vibration mechanism.

11. The stroller attachable mobile support of claim 9 wherein:

said forward U-shaped mobile support includes a battery compartment, a two-position on/off switch, and said vibration mechanism;

said two-position on/off switch being wired in controlling connection with said vibration mechanism.

* * * * *